(12) United States Patent
Oh et al.

(10) Patent No.: US 9,919,632 B2
(45) Date of Patent: Mar. 20, 2018

(54) CUP HOLDER FOR VEHICLE

(71) Applicants: Hyundai Motor Company, Seoul (KR); KBAUTOTECH CO., LTD., Asan-si (KR)

(72) Inventors: Man Ju Oh, Whasung-Si (KR); Jae Woong Kim, Whasung-Si (KR); Jae Woo Park, Whasung-Si (KR); Jae Hoon Kim, Whasung-Si (KR)

(73) Assignees: Hyundai Motor Company, Seoul (KR); KBAUTOTECH CO., LTD., Asan-si (KR)

( * ) Notice: Subject to any disclaimer, the term of this patent is extended or adjusted under 35 U.S.C. 154(b) by 664 days.

(21) Appl. No.: 14/299,439

(22) Filed: Jun. 9, 2014

(65) Prior Publication Data

US 2015/0175046 A1    Jun. 25, 2015

(30) Foreign Application Priority Data

Dec. 19, 2013   (KR) .................. 10-2013-0159547

(51) Int. Cl.
| | |
|---|---|
| F25B 21/02 | (2006.01) |
| B60N 3/10 | (2006.01) |
| B60Q 3/20 | (2017.01) |
| B60Q 3/80 | (2017.01) |

(52) U.S. Cl.
CPC ............ B60N 3/104 (2013.01); B60N 3/106 (2013.01); B60Q 3/20 (2017.02); B60Q 3/80 (2017.02)

(58) Field of Classification Search
CPC ........ B60N 3/106; B60N 3/083; B60N 3/101; B60N 3/104; B60N 2/4686

USPC ........................................................... 62/3.3
See application file for complete search history.

(56) References Cited

U.S. PATENT DOCUMENTS

| | | | | |
|---|---|---|---|---|
| 4,194,651 A | * | 3/1980 | Martin ................. | A47J 31/401 222/108 |
| 4,487,619 A | * | 12/1984 | Jones ..................... | F25B 21/04 62/177 |
| 5,282,364 A | * | 2/1994 | Cech ..................... | F24H 4/06 165/80.3 |

(Continued)

FOREIGN PATENT DOCUMENTS

| | | |
|---|---|---|
| JP | 2012-99417 A | 5/2012 |
| KR | 10-2005-0100507 A | 10/2005 |

(Continued)

*Primary Examiner* — David Teitelbaum
*Assistant Examiner* — Filip Zec
(74) *Attorney, Agent, or Firm* — Morgan, Lewis & Bockius LLP

(57) ABSTRACT

A cup holder for a vehicle includes a holder body, a support unit, a temperature sensor, and a control unit. The holder body is configured to accommodate a cup, is provided with a thermoelectric element, is formed in a double sidewall structure, and is provided with an internal blower that is disposed in the inner space of the double sidewall structure. The support unit is configured such that the front portion thereof protrudes from the inner side of the holder body and supports a side of the cup, and is provided with an illuminant that is capable of expressing a plurality of colors and radiates light onto the cup. The temperature sensor is provided on the holder body, and measures temperature. The control unit changes the color of the illuminant of the support unit based on the measured temperature.

10 Claims, 3 Drawing Sheets

(56) References Cited

U.S. PATENT DOCUMENTS

| | | | | |
|---|---|---|---|---|
| 5,720,171 | A * | 2/1998 | Osterhoff | A47J 36/2461 |
| | | | | 62/298 |
| 6,282,906 | B1 * | 9/2001 | Cauchy | B60N 2/4686 |
| | | | | 62/244 |
| 8,485,680 | B2 * | 7/2013 | Anderson | B60N 3/108 |
| | | | | 224/926 |
| 8,960,944 | B2 * | 2/2015 | Foo | A47G 23/0216 |
| | | | | 362/154 |
| 9,163,863 | B1 * | 10/2015 | Armstrong | B60N 3/104 |
| 9,493,102 | B2 * | 11/2016 | Tang | B60N 3/104 |
| 2007/0204629 | A1 * | 9/2007 | Lofy | B60N 3/104 |
| | | | | 62/3.61 |
| 2009/0038317 | A1 * | 2/2009 | Otey | F25B 21/04 |
| | | | | 62/3.2 |
| 2012/0217772 | A1 * | 8/2012 | Tang | B60N 3/104 |
| | | | | 297/188.01 |

FOREIGN PATENT DOCUMENTS

| | | |
|---|---|---|
| KR | 10-2012-0118930 A | 10/2012 |
| KR | 10-2012-0130764 A | 12/2012 |
| KR | 10-1421929 B1 | 7/2014 |

* cited by examiner

CUP HOLDER FOR VEHICLE

CROSS-REFERENCE(S) TO RELATED APPLICATION

The present application claims priority of Korean Patent Application Number 10-2013-0159547 filed on Dec. 19, 2013, the entire contents of which application are incorporated herein for all purposes by this reference.

BACKGROUND OF INVENTION

Field of Invention

The present invention relates generally to a cup holder for a vehicle and, more particularly, to a cup holder which is capable of enabling the temperature of the cup holder to be determined from the outside, fundamentally preventing accidents and injuries attributable to a user's carelessness, such as a burn injury, and effectively managing energy that is used to cool or heat the cup holder.

Description of Related Art

Generally, a thermoelectric element is used to selectively cool or heat a cup holder, and thus the cup holder can be installed in a compact space in a vehicle.

However, the cup holder using the thermoelectric element is problematic in that it is difficult to identify whether the cup holder is currently being cooled or heated. In addition, it has the risk of causing accidents and injuries attributable to a user's carelessness, such as a burn injury.

Therefore, in order to overcome the above problems, there is a need to enable the status of the cup holder to be determined using the color of light and also prevent accidents, such as a burn injury. In addition, there is a need to implement the cup holder in a unique design that can enhance its aesthetic value.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made keeping in mind the above problems occurring in the prior art and/or other problems, and the present invention is directed to provide a cup holder which is capable of enabling the temperature of the cup holder to be determined from the outside, fundamentally preventing accidents and injuries attributable to a user's carelessness, such as a burn injury, and effectively managing energy that is used to cool or heat the cup holder.

In accordance with various aspects of the present invention, there is provided a cup holder for a vehicle, including: a holder body configured to accommodate a cup, provided with a thermoelectric element that cools or heats the cup, formed in a double sidewall structure, and provided with an internal blower that is disposed in the inner space of the double sidewall structure and circulates air around the cup; a support unit configured such that the front portion thereof protrudes from the inner side of the holder body and supports a side of the cup accommodated in the holder body, and provided with an illuminant that is capable of expressing a plurality of colors and radiates light onto the cup; a temperature sensor provided on the holder body, and configured to measure temperature; and a control unit configured to change a color of the illuminant of the support unit based on the measured temperature.

The holder body may include an inside holder body configured to accommodate the cup and to come into contact with the thermoelectric element, and an outside holder body configured to surround the inside holder body, wherein the internal blower is disposed in between the inside holder body and the outside holder body.

The internal blower may draw air between the inside holder body and the outside holder body, and may discharge the air toward the accommodated cup via a vent hole formed through the inside holder body. The support unit may be made of transparent material and provided with the illuminant including blue and red illuminants, and the control unit may separately control the light intensity of each of the blue and red illuminants.

When a cooling operation is performed, the control unit may operate the internal blower and an external blower, and may change a color of the illuminant of the support unit based on the measured temperature. When the cooling operation is terminated, the control unit may immediately stop the internal blower, and may keep the external blower operated for a predetermined time.

When a heating operation is performed, the control unit may not operate the internal blower or an external blower, and may change a color of the illuminant of the support unit based on the measured temperature.

When a cooling or heating operation is performed, the control unit may maximize a control duty of the thermoelectric element if the measured temperature has not reached a target temperature, and may reduce the control duty of the thermoelectric element if the measured temperature has reached the target temperature.

An opening may be formed through a side of an inside holder body, and a front portion of the support unit may protrude from the inner side of the inside holder body through the opening. The support unit may be provided with the illuminant including blue and red illuminants, and the control unit may separately control the light intensity of each of the illuminants. The control unit may control the support unit so that the support unit radiates darker red light in proportion to hotness of an inside holder body and radiates darker blue light in proportion to coldness of an inside holder body.

The cup holder may further include a switch configured to receive a request to cool or heat the accommodated cup. The control unit may operate the thermoelectric element and the illuminant of the support unit only when receiving the request through the switch.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
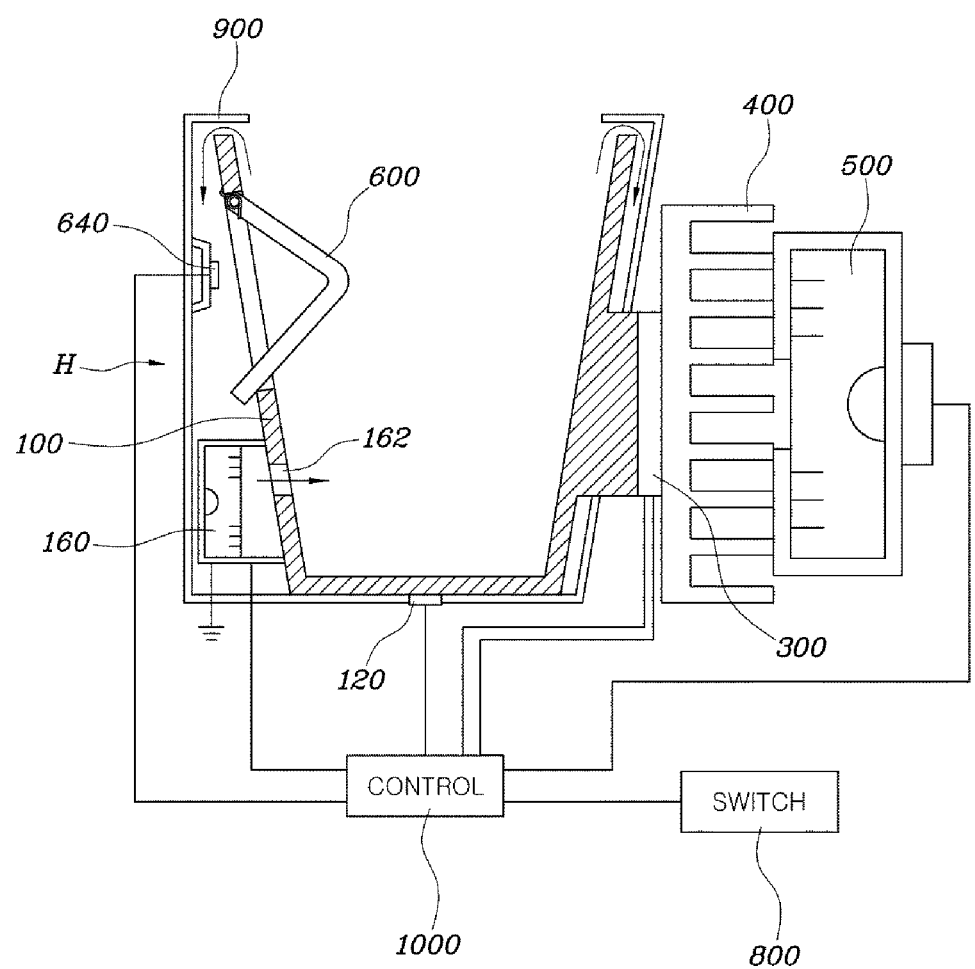
FIG. 1 is a cross-sectional view of an exemplary cup holder for a vehicle according to the present invention.
Figure 2:
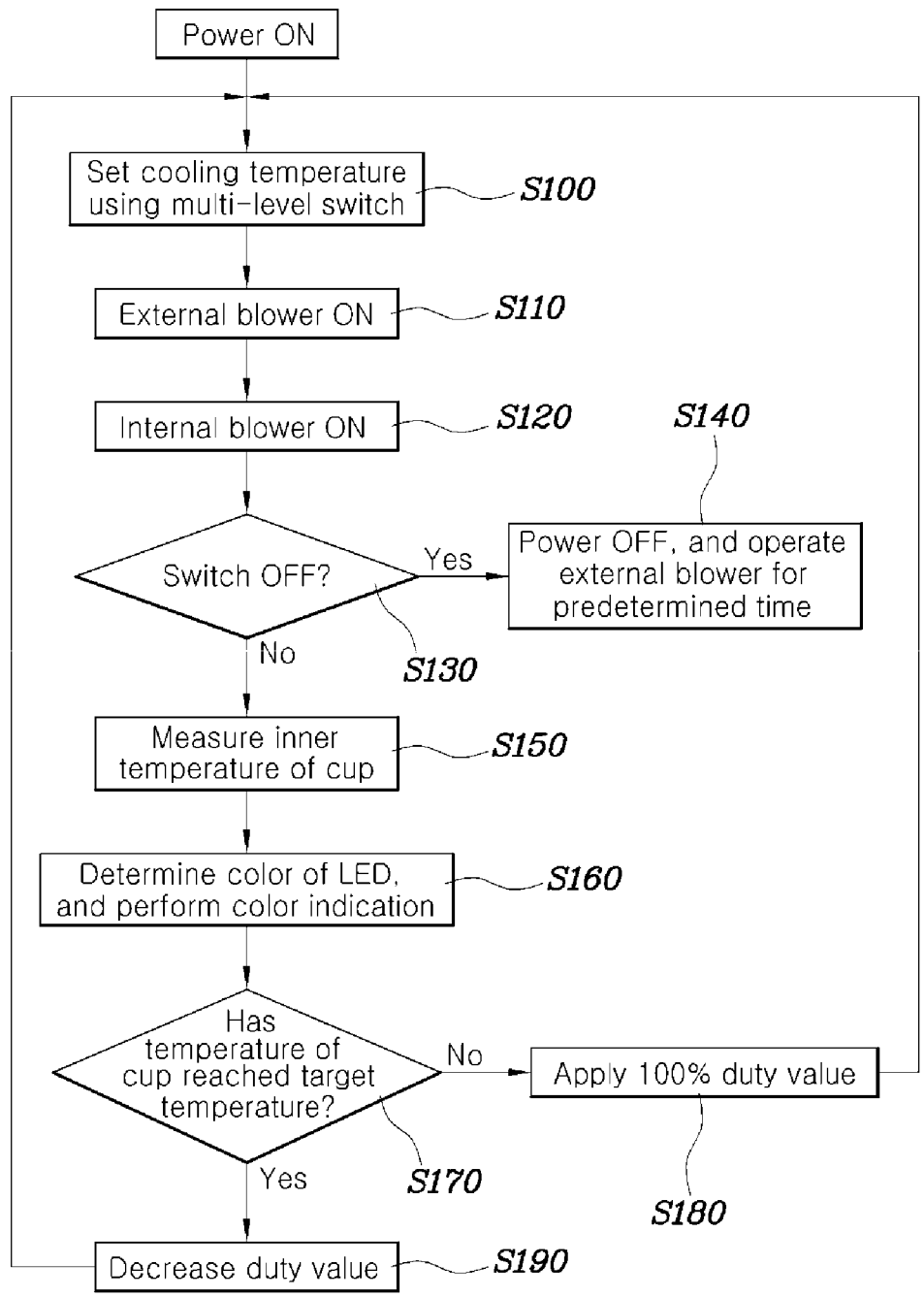
FIGS. 2 and 3 are flowcharts illustrating an exemplary control process for a cup holder for a vehicle according to the present invention.
Figure 3:
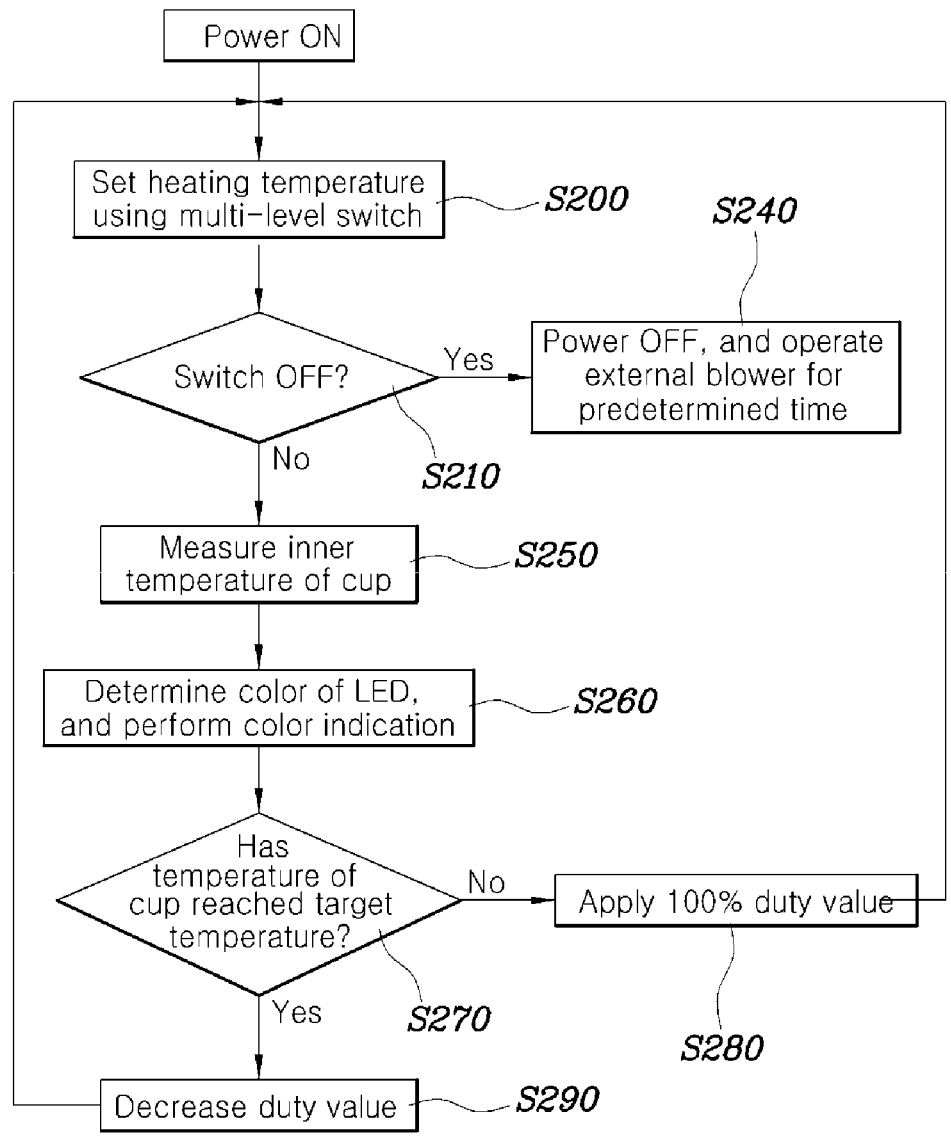

FIG. 1 is a cross-sectional view of a cup holder for a vehicle according to various embodiments of the present invention. FIGS. 2 to 3 are flowcharts illustrating a control process for the cup holder for a vehicle according to various embodiments of the present invention.

The cup holder for a vehicle according to various embodiments of the present invention may include a holder body H configured to accommodate a cup, provided with a thermoelectric element 300 that cools or heats the cup, formed in a double sidewall structure, and provided with an internal blower 160 that is disposed in the inner space of the double sidewall structure and circulates air surrounding the cup; a support unit 600 configured such that a front portion thereof protrudes from an inner side of the holder body H and supports a side of the cup accommodated in the holder body H, and provided with illuminant 640 that is capable of expressing a plurality of colors and radiates light onto the cup; a temperature sensor 120 provided on the holder body H, and configured to measure temperature; and a control unit 1000 configured to change the color of the illuminant 640 of the support unit 600 based on a temperature value measured by the temperature sensor 120.

The cup holder according to various embodiments of the present invention selectively cools and heats the accommodated cup. For this purpose, the cup holder includes the thermoelectric element 300. As an example, such as an embodiment illustrated in FIG. 1, an inside holder body 100 is made of metal and the thermoelectric element 300 is attached onto the holder body 100, thereby selectively cooling or heating the cup via conduction. Furthermore, to utilize the convection current of air, an outside holder body 900 is configured to be spaced apart from the inside holder body 100 by a predetermined distance and then surround the inside holder body 100. The internal blower 160 is disposed in the space between the inside holder body 100 and the outside holder body 900, and draws air between the upper ends of the inside holder body 100 and the outside holder body 900 and discharges the air toward the accommodated cup through a vent hole 162 formed in the inside holder body 100, thereby forming a flow of air around the accommodated cup and thus achieving heat transfer attributable to the convection current of air.

Radiation fins 400 and an external blower 500 configured to radiate heat may be provided on another side of the thermoelectric element 300.

The cup is accommodated in the inside holder body 100 and the inside holder body 100 is provided with the thermoelectric element 300, thereby selectively cooling or heating the accommodated cup.

In addition, the support unit 600 is configured such that the front portion thereof protrudes from the inner side of the inside holder body 100 and a rear portion thereof is configured to be elastic, thereby supporting a side of the cup when the cup is accommodated therein. In particular, the support unit 600 is provided with the illuminant 640 capable of expressing a plurality of colors, and thus radiating light onto the cup.

As an example, such as an embodiment illustrated in FIG. 1, the support unit 600 is provided with the illuminant 640 including blue and red illuminants, and the control unit 100 separately controls the light intensity of each of the illuminants. In order to radiate light, the support unit 600 is provided with a bent portion that is made of transparent material and protrudes toward an accommodated cup. Additionally, the radiation angle of the illuminant 640 is controlled so that light is radiated toward a side or the lower portion of the cup in order to prevent the user from being dazzled.

Meanwhile, the temperature sensor 120 is provided on the inside holder body 100 to measure temperature, and the control unit 1000 changes the color of the illuminant 640 of the support unit 600 based on a temperature value measured by the temperature sensor 120.

More specifically, an opening is formed through a side of the inside holder body 100, and the support unit 600 protrudes from the inner side of the inside holder body 100 through the opening. Accordingly, the support unit 600 radiates light onto a side of the cup while supporting the cup, thereby allowing the light to naturally and delicately spread across the space between the accommodated cup and the inside holder body 100. This provides the user with an aesthetic value, and at the same time, prevents the user from being dazzled.

In addition, the control unit 1000 may control the support unit 600 so that the support unit 600 radiates darker red light in proportion to hotness of the inside holder body 100 and so that the support unit 600 radiates darker blue light in proportion to coldness of the inside holder body 100. This enables the user to intuitively be aware of the temperature status of the cup. In particular, when the cup is hot, the user may be more wary of a burn injury.

Meanwhile, the cup holder according to the present invention may further include a switch 800 configured to receive a request to cool or heat the accommodated cup. In addition, the control unit 1000 may operate the thermoelectric element 300 and the illuminant of the support unit 600 only when receiving the request through the switch 800.

According to various embodiments of the present invention, the holder body H includes the inside holder body 100 configured to accommodate a cup and to come into contact with the thermoelectric element 300, and the outside holder body 900 configured to surround the inside holder body 100 and to have the internal blower 160 between the inside holder body 100 and itself. In addition, the internal blower 160 draws air between the inside holder body 100 and the outside holder body 900, and discharges the air toward the accommodated cup via the vent hole 162 formed through the inside holder body 100.

Meanwhile, the support unit 600 is made of transparent material and provided with the illuminant 640 including a plurality of illuminants such as blue and red illuminants, and the control unit 100 separately controls the light intensity of each of the illuminants.

In particular, as described in FIG. 2, when a cooling operation is performed, the control unit 1000 operates the internal blower and the external blower, and changes the color of the illuminant of the support unit based on a temperature value measured by the temperature sensor at steps S100, S110, S120, S150, and S160. In addition, when the cooling operation is terminated, the control unit 1000 immediately stops the internal blower and keeps the external blower operated for a predetermined time at steps S130 and S140. This can reduce heat impact that may occur on the thermal radiation side of the thermoelectric element, and thus the durability of the thermoelectric element can be enhanced.

Meanwhile, as described in FIG. 3, when a heating operation is performed, the control unit 1000 does not operate the internal blower and the external blower and changes the color of the illuminant of the support unit based on a temperature value measured by the temperature sensor at steps S200, S210, S250 and S260.

In addition, when a cooling or heating operation is performed, the control unit 1000 maximizes the control duty of the thermoelectric element if a temperature value measured by the temperature sensor has not reached a target temperature at steps S170, S180, S270 and S280, and reduces the control duty of the thermoelectric element if the temperature value measured by the temperature sensor has reached the target temperature at steps S190 and S290.

The cup holder for a vehicle according to the present invention is advantageous in that it is capable of enabling the temperature of the cup holder to be determined from the outside, fundamentally preventing accidents and injuries attributable to a user's carelessness, such as a burn injury, and effectively managing energy that is used to cool or heat the cup holder. In addition, cup holder for a vehicle according to the present invention is advantageous in that it is capable of performing temperature control so that beverage in the cup can be maintained at an appropriate temperature, enhancing the durability of the thermoelectric element, and preventing overheating.

For convenience in explanation and accurate definition in the appended claims, the terms "upper" or "lower", "front" or "rear", "inside" or "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A cup holder for a vehicle, comprising:
  a holder body configured to accommodate a cup, provided with a thermoelectric element that cools or heats the cup, formed in a double sidewall structure, and provided with an internal blower that is disposed in an inner space of the double sidewall structure and circulates air around the cup;
  a support unit wherein a front portion of the support unit protrudes from an inner side of the holder body and supports a side of the cup accommodated in the holder body and is provided with an illuminant that is configured for expressing a plurality of colors and radiates light onto the cup;
  a temperature sensor provided on the holder body, and configured to measure temperature; and
  a control unit configured to change a color of the illuminant of the support unit based on the measured temperature,
  wherein the control unit selectively operates the internal blower or an external blower according to a cooling operation or a heating operation, the internal blower being installed separately from the external blower,
  wherein the control unit, when the cooling operation is performed, operates the internal blower and the external blower, and changes a color of the illuminant of the support unit based on the measured temperature,
  wherein the control unit, when the cooling operation is terminated, stops the internal blower and keeps the external blower operated for a predetermined time, and
  wherein the control unit, when the heating operations is performed, does not operate the internal blower or the external blower, and changes a color of the illuminant of the support unit based on the measured temperature.

2. The cup holder of claim 1, wherein the holder body comprises an inside holder body configured to accommodate the cup and to come into contact with the thermoelectric element, and an outside holder body configured to surround the inside holder body, wherein the internal blower is disposed in between the inside holder body and the outside holder body.

3. The cup holder of claim 2, wherein the internal blower draws air between the inside holder body and the outside holder body, and discharges the air toward the accommodated cup via a vent hole formed through the inside holder body.

4. The cup holder of claim 1, wherein the support unit is made of transparent material and provided with the illuminant including blue and red illuminants, and the control unit separately controls light intensity of each of the blue and red illuminants.

5. The cup holder of claim 1, wherein the control unit, when a cooling or heating operation is performed, maximizes a control duty of the thermoelectric element if the measured temperature has not reached a target temperature, and reduces the control duty of the thermoelectric element if the measured temperature has reached the target temperature.

6. The cup holder of claim 1, wherein an opening is formed through a side of an inside holder body, and a front portion of the support unit protrudes from an inner side of the inside holder body through the opening.

7. The cup holder of claim 1, wherein the support unit is provided with the illuminant including blue and red illuminants, and the control unit separately controls light intensity of each of the illuminants.

8. The cup holder of claim 7, wherein the control unit controls the support unit so that the support unit radiates darker red light in proportion to hotness of an inside holder body and radiates darker blue light in proportion to coldness of an inside holder body.

9. The cup holder of claim 1, further comprising a switch configured to receive a request to cool or heat the accommodated cup.

10. The cup holder of claim 9, wherein the control unit operates the thermoelectric element and the illuminant of the support unit only when receiving the request through the switch.

* * * * *